United States Patent
Kim (10) Patent No.: US 12,436,857 B2
(45) Date of Patent: Oct. 7, 2025

(54) STORAGE DEVICE EXECUTING ERROR CHECK ON MEMORY BLOCK IN WHICH FIRMWARE IS STORED, SYSTEM AND OPERATING METHOD OF THE STORAGE DEVICE

(71) Applicant: SK hynix Inc., Gyeonggi-do (KR)

(72) Inventor: Chang Han Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 64 days.

(21) Appl. No.: 18/499,225

(22) Filed: Nov. 1, 2023

(65) Prior Publication Data
US 2025/0028614 A1 Jan. 23, 2025

(30) Foreign Application Priority Data
Jul. 18, 2023 (KR) .................. 10-2023-0092785

(51) Int. Cl.
*G06F 11/00* (2006.01)
*G06F 11/22* (2006.01)
(52) U.S. Cl.
CPC .................. *G06F 11/2284* (2013.01)
(58) Field of Classification Search
CPC .................. G06F 11/2284
See application file for complete search history.

(56) References Cited

U.S. PATENT DOCUMENTS

| | | | | |
|---|---|---|---|---|
| 6,357,021 B1* | 3/2002 | Kitagawa | .................. | G06F 8/65 714/E11.135 |
| 6,708,231 B1* | 3/2004 | Kitagawa | .................. | G06F 8/65 713/1 |
| 8,806,283 B1* | 8/2014 | Allison | .............. | G01R 31/2808 714/36 |
| 11,386,203 B2 | 7/2022 | Hahn et al. | | |
| 11,742,048 B2* | 8/2023 | Perner | .................... | G11C 29/10 714/764 |
| 2009/0217023 A1* | 8/2009 | Griech | ...................... | G06F 8/65 717/168 |
| 2018/0088841 A1* | 3/2018 | Ma | ........................ | G06F 12/0246 |
| 2021/0012851 A1* | 1/2021 | Huang | .................. | G11C 29/886 |
| 2023/0350574 A1* | 11/2023 | Kerstetter | ........... | G06F 11/0787 |

FOREIGN PATENT DOCUMENTS

KR 10-2020-0076886 A 6/2020

* cited by examiner

*Primary Examiner* — Jason B Bryan
(74) *Attorney, Agent, or Firm* — IP & T GROUP LLP

(57) ABSTRACT

A storage device may receive, from a host, a first command instructing the storage device to execute an error check on a first memory block among a plurality of memory blocks. The storage device may transmit result information for the error check to the host. In this case, default firmware to be loaded when a booting operation is executed may be stored in the first memory block.

17 Claims, 10 Drawing Sheets

STORAGE DEVICE EXECUTING ERROR CHECK ON MEMORY BLOCK IN WHICH FIRMWARE IS STORED, SYSTEM AND OPERATING METHOD OF THE STORAGE DEVICE

CROSS-REFERENCES TO RELATED APPLICATION

The present application claims priority under 35 U.S.C. 119(a) to Korean patent application number 10-2023-0092785, filed on Jul. 18, 2023, which is incorporated herein by reference in its entirety.

BACKGROUND

1. Technical Field

Various embodiments of the present disclosure generally relate to a storage device executing error check on a memory block in which firmware is stored, system and operating method of the storage device.

2. Related Art

A storage device is a device for storing data according to a request from an external device such as a computer, a mobile terminal (e.g., a smart phone or tablet), or the like.

A storage device may include a memory for storing data therein and a controller for controlling the memory. The memory may be a volatile memory or a non-volatile memory. The controller may receive a command from an external device (i.e., a host), and execute or control operations to read, write, or erase data in the memory included in the storage device according to the received command.

When the controller of the storage device executes a booting operation, the controller may load firmware stored in the memory and execute (drive) the loaded firmware. If an error exists in the firmware, the storage device cannot operate normally. Therefore, the storage device needs to ensure stability and reliability of the firmware.

SUMMARY

Embodiments of the present disclosure may provide a storage device capable of increasing stability and reliability of the memory block in which the firmware is stored, system and operating method of the storage device.

In one aspect, embodiments of the present disclosure may provide a storage device including a memory including a plurality of memory blocks; and a controller configured to receive, from a host, a first command instructing the storage device to execute an error check on a first memory block among the plurality of memory blocks, and transmit result information for the error check to the host. The first memory block may be configured to store default firmware to be loaded when a booting operation is executed.

In another aspect, embodiments of the present disclosure may provide an operating method of a storage device including receiving, from a host, a first command instructing the storage device to execute an error check on a first memory block among a plurality of memory blocks included in the storage device; executing the error check on the first memory block; and transmitting result information for the error check to the host. The first memory block may be configured to store default firmware to be loaded when a booting operation is executed.

In another aspect, embodiments of the present disclosure may provide a system including a host and a storage device including a plurality of memory blocks. In this case, the storage device may receive, from the host, a request instructing the storage device to execute an error check on a first memory block among the plurality of memory blocks, and execute the error check on the first memory block. The storage device may transmit result information for the error check to the host. The first memory block may be configured to store default firmware to be loaded when the storage device executes a booting operation.

According to embodiments of the present disclosure, it is possible to increase stability and reliability of the memory block in which the firmware is stored.

DETAIL DESCRIPTION

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily limited to the same embodiment(s). The term "embodiments" when used herein does not necessarily refer to all embodiments.

Various embodiments of the present invention are described below in more detail with reference to the accompanying drawings. However, the present invention may be embodied in different forms and variations, and should not be construed as being limited to the embodiments set forth herein. Rather, the described embodiments are provided so that this disclosure will be thorough and complete, and will fully convey the present invention to those skilled in the art to which this invention pertains. Throughout this disclosure, like reference numerals refer to like parts throughout the various figures and embodiments of the present invention.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented at least partially in software, the controllers, processors, devices, modules, units, multiplexers, logic, interfaces, decoders, drivers, generators and other signal generating and signal processing features may include, for example, a memory or other storage device for storing code or instructions to be executed, for example, by a computer, processor, microprocessor, controller, or other signal processing device.

Figure 1:
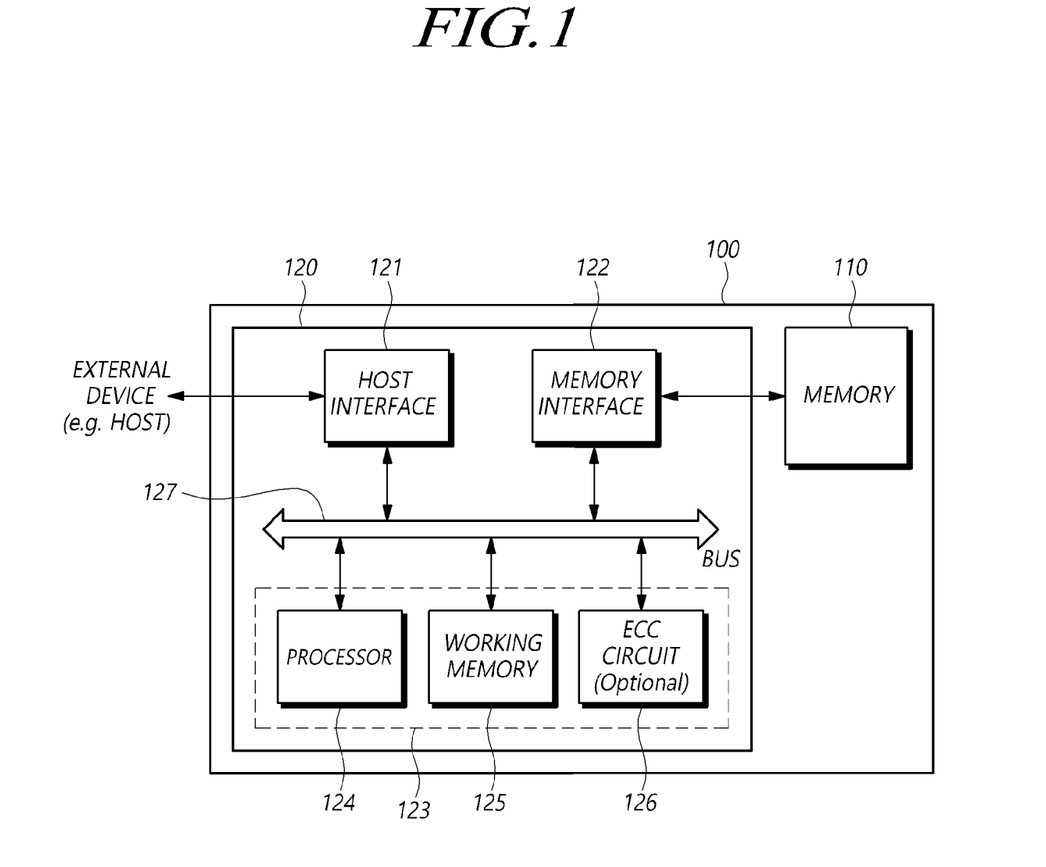
FIG. 1 is a schematic configuration diagram of a storage device according to an embodiment of the present disclosure.

FIG. 1 is a schematic configuration diagram of a storage device 100 according to an embodiment of the present disclosure.

Referring to FIG. 1, the storage device 100 may include a memory 110 that stores data and a controller 120 that controls the memory 110.

The memory 110 includes a plurality of memory blocks, and operates under the control of the controller 120. Operations of the memory 110 may include, for example, a read operation, a program operation (also referred to as a write operation) and an erase operation.

The memory 110 may include a memory cell array including a plurality of memory cells (also simply referred to as "cells") that store data.

For example, the memory 110 may be realized in various types of memory such as a DDR SDRAM (double data rate synchronous dynamic random access memory), an LPDDR4 (low power double data rate 4) SDRAM, a GDDR (graphics double data rate) SDRAM, an LPDDR (low power DDR), an RDRAM (Rambus dynamic random access memory), a NAND flash memory, a 3D NAND flash memory, a NOR flash memory, a resistive random access memory (RRAM), a phase-change memory (PRAM), a magnetoresistive random access memory (MRAM), a ferroelectric random access memory (FRAM) and a spin transfer torque random access memory (STT-RAM).

The memory 110 may be implemented as a three-dimensional array structure. For example, embodiments of the present disclosure may be applied to a charge trap flash (CTF) in which a charge storage layer is configured by a dielectric layer and a flash memory in which a charge storage layer is configured by a conductive floating gate.

The memory 110 may receive a command and an address from the controller 120 and may access an area in the memory cell array, which is selected by the address. The memory 110 may perform an operation instructed by the command, on the area selected by the address.

The memory 110 may perform a program operation, a read operation or an erase operation. For example, when performing the program operation, the memory 110 may program data to the area selected by the address. When performing the read operation, the memory 110 may read data from the area selected by the address. In the erase operation, the memory 110 may erase data stored in the area selected by the address.

The controller 120 may control write (program), read, erase and background operations for the memory 110. For example, background operations may include at least one of a garbage collection (GC) operation, a wear leveling (WL) operation, a read reclaim (RR) operation, a bad block management (BBM) operation, and so forth.

The controller 120 may control the operations of the memory 110 according to a request from an external device (e.g., a host) located outside the storage device 100. The controller 120, however, also may control the operations of the memory 110 regardless of a request from the host.

The host may be a computer, an ultra mobile PC (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a computer network, one of various electronic devices configuring a telematics network, an RFID (radio frequency identification) device, and a mobility device (e.g., a vehicle, a robot or a drone) capable of driving under human control or autonomous driving, as non-limiting examples. Alternatively, the host may be a virtual reality (VR) device providing 2D or 3D virtual reality images or an augmented reality (AR) device providing augmented reality images. The host may be any of various electronic devices that require the storage device 100 capable of storing data.

The host may include at least one operating system (OS). The operating system may generally manage and control the function and operation of the host, and may control interoperability between the host and the storage device 100. The operating system may be classified into a general operating system and a mobile operating system depending on the mobility of the host.

The controller 120 and the host may be devices that are separated from each other, or the controller 120 and the host may be integrated into one device. Hereunder, for the sake of convenience, descriptions will describe the controller 120 and the host as devices that are separated from each other.

Referring to FIG. 1, the controller 120 may include a memory interface 122, a control circuit 123, and a host interface 121.

The host interface 121 may provide an interface for communication with the host. For example, the host interface 121 provides an interface that uses at least one of various communication interfaces or standards such as a USB (universal serial bus) protocol, an MMC (multimedia card) protocol, a PCI (peripheral component interconnection) protocol, a PCI-E (PCI-express) protocol, an ATA (advanced technology attachment) protocol, a serial-ATA protocol, a parallel-ATA protocol, an SCSI (small computer system interface) protocol, an ESDI (enhanced small disk interface) protocol, an IDE (integrated drive electronics) protocol and a private protocol.

When receiving a command from the host, the control circuit 123 may receive the command through the host interface 121, and may perform an operation of processing the received command.

The memory interface 122 may be coupled with the memory 110 to provide an interface for communication with the memory 110. That is, the memory interface 122 may provide an interface between the memory 110 and the controller 120 under the control of the control circuit 123.

The control circuit 123 may perform general control operations of the controller 120 to control the operations of the memory 110. To this end, for instance, the control circuit 123 may include a processor 124 and a working memory 125, and may further include an error detection and correction circuit (ECC circuit) 126.

The processor 124 may control general operations of the controller 120, and may perform a logic calculation. The processor 124 may communicate with the host through the host interface 121, and may communicate with the memory 110 through the memory interface 122.

The processor 124 may execute logical operations required to perform the function of a flash translation layer (FTL). The processor 124 may translate a logical block address (LBA), provided by the host, into a physical block address (PBA) through the flash translation layer (FTL). The flash translation layer (FTL) may receive the logical block address (LBA) and translate the logical block address (LBA) into the physical block address (PBA), by using a mapping table.

There are various address mapping methods of the flash translation layer, depending on a mapping unit. Representative address mapping methods include a page mapping method, a block mapping method and a hybrid mapping method.

The processor 124 may randomize data received from the host. For example, the processor 124 may randomize data received from the host by using a set randomizing seed. The randomized data may be provided to the memory 110, and may be programmed to a memory cell array of the memory 110.

In a read operation, the processor 124 may derandomize data received from the memory 110. For example, the processor 124 may derandomize data received from the memory 110 by using a derandomizing seed. The derandomized data may be outputted to the host.

The processor 124 may execute firmware to control the operations of the controller 120. Namely, in order to control the general operation of the controller 120 and perform a logic calculation, the processor 124 may execute (drive) firmware loaded in the working memory 125 upon booting. Hereafter, an operation of the storage device 100 according to embodiments of the present disclosure will be described as implementing a processor 124 that executes firmware in which the corresponding operation is defined.

Firmware, is a program to be executed in the storage device 100 to drive the storage device 100 and may include various functional layers. For example, the firmware may include binary data in which codes for executing the functional layers, respectively, are defined.

For example, the firmware may include at least one of a flash translation layer (FTL), which performs a translating function between a logical address requested to the storage device 100 from the host and a physical address of the memory 110; a host interface layer (HIL), which serves to analyze a command requested to the storage device 100 as a storage device from the host and transfer the command to the flash translation layer (FTL); and a flash interface layer (FIL), which transfers a command, instructed from the flash translation layer (FTL), to the memory 110.

Such firmware may be loaded in the working memory 125 from, for example, the memory 110 or a separate nonvolatile memory (e.g., a ROM or a NOR Flash) located outside the memory 110. The processor 124 may first load all or a part of the firmware in the working memory 125 when executing a booting operation after power-on.

The processor 124 may perform a logic calculation which is defined in the firmware loaded in the working memory 125, to control the general operation of the controller 120. The processor 124 may store a result of performing the logic calculation defined in the firmware, in the working memory 125. The processor 124 may control the controller 120 according to a result of performing the logic calculation defined in the firmware such that the controller 120 generates a command or a signal. When a part of firmware, in which a logic calculation to be performed is defined, is stored in the memory 110, but not loaded in the working memory 125, the processor 124 may generate an event (e.g., an interrupt) for loading the corresponding part of the firmware into the working memory 125 from the memory 110.

The processor 124 may load metadata used for driving firmware from the memory 110. The metadata which is data for managing the memory 110, may include, for example, management information on user data stored in the memory 110.

Firmware may be updated while the storage device 100 is manufactured or while the storage device 100 is operating. The controller 120 may download new firmware from the outside of the storage device 100 and update existing firmware with the new firmware.

To drive the controller 120, the working memory 125 may store firmware, a program code, a command and data. The working memory 125 may be a volatile memory that includes, for example, at least one of an SRAM (static RAM), a DRAM (dynamic RAM) and an SDRAM (synchronous DRAM). Moreover, the controller 120 may additionally use a separate volatile memory (e.g., SRAM, DRAM) located outside the controller 120 in addition to the working memory 125.

The error detection and correction circuit 126 may detect an error bit of target data, and correct the detected error bit by using an error correction code. The target data may be, for example, data stored in the working memory 125 or data read from the memory 110.

The error detection and correction circuit 126 may decode data by using an error correction code. The error detection and correction circuit 126 may be realized by various code decoders. For example, a decoder that performs unsystematic code decoding or a decoder that performs systematic code decoding may be used.

For example, the error detection and correction circuit 126 may detect an error bit by the unit of a set sector in each of the read data, when each read data is constituted by a plurality of sectors. A sector may mean a data unit that is smaller than a page which is the read unit of a flash memory. Sectors constituting each read data may be matched with one another using an address.

The error detection and correction circuit 126 may calculate a bit error rate (BER), and may determine whether an error is correctable or not, by sector units. For example, when a bit error rate (BER) is higher than a reference value, the error detection and correction circuit 126 may determine that a corresponding sector is uncorrectable or a fail. On the other hand, when a bit error rate (BER) is lower than the reference value, the error detection and correction circuit 126 may determine that a corresponding sector is correctable or a pass.

The error detection and correction circuit 126 may perform an error detection and correction operation sequentially for all read data. In the case where a sector included in read data is correctable, the error detection and correction circuit 126 may omit an error detection and correction operation for a corresponding sector for next read data. If the error detection and correction operation for all read data is ended in this way, then the error detection and correction circuit 126 may detect a sector which is uncorrectable in read data last. There may be one or more sectors that are determined to be uncorrectable. The error detection and correction circuit 126 may transfer information (e.g., address information) regarding a sector which is determined to be uncorrectable to the processor 124.

A bus 127 may provide channels among the components 121, 122, 124, 125 and 126 of the controller 120. The bus 127 may include, for example, a control bus for transferring various control signals, commands and the like, a data bus for transferring various data, and so forth.

Some components among the above-described components 121, 122, 124, 125 and 126 of the controller 120 may be omitted, or some components among the above-described components 121, 122, 124, 125 and 126 of the controller 120 may be integrated into one component. In addition to the above-described components 121, 122, 124, 125 and 126 of the controller 120, one or more other components may be added.

Hereinbelow, the memory 110 will be described in further detail with reference to FIG. 2.

Figure 2:
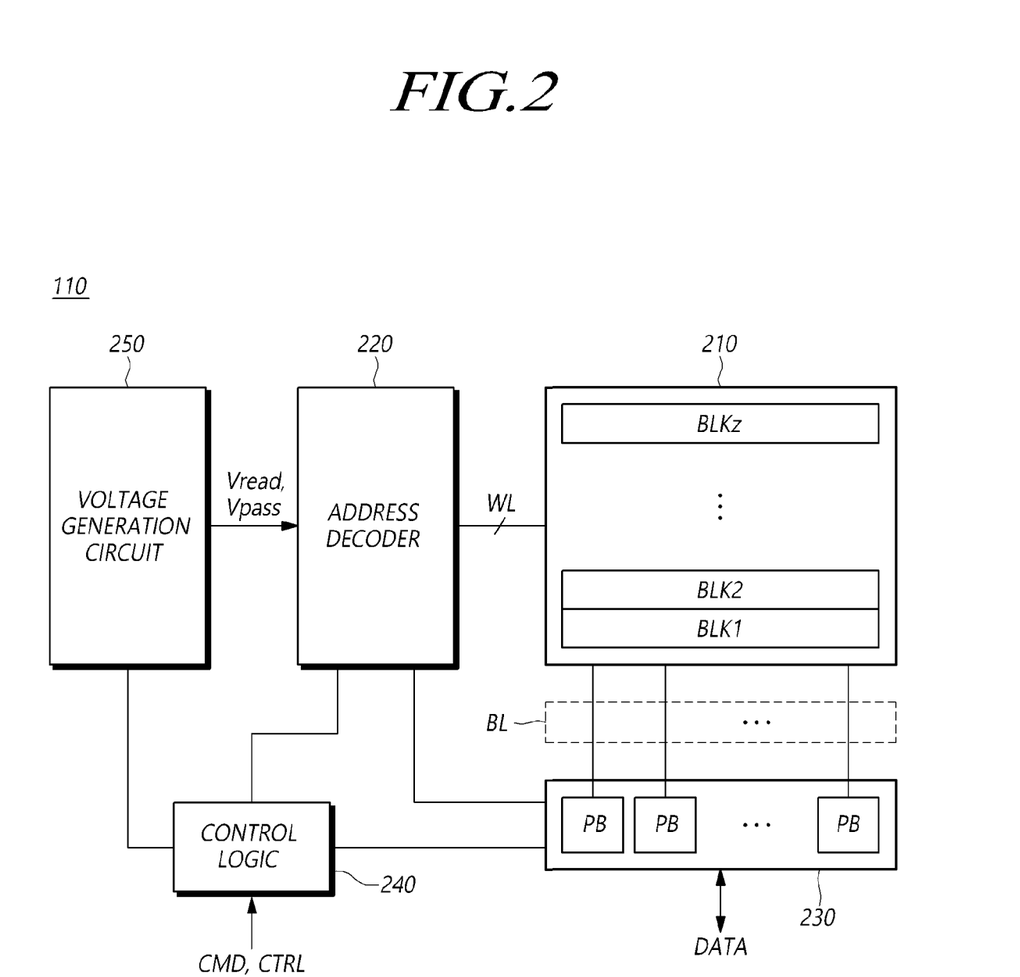
FIG. 2 is a block diagram schematically illustrating a memory of FIG. 1.

FIG. 2 is a block diagram schematically illustrating the memory 110 of FIG. 1.

Referring to FIG. 2, the memory 110 may include a memory cell array 210, an address decoder 220, a read and write circuit 230, a control logic 240, and a voltage generation circuit 250.

The memory cell array 210 may include a plurality of memory blocks BLK1 to BLKz, where z is a natural number of 2 or greater.

In the plurality of memory blocks BLK1 to BLKz, a plurality of word lines WL and a plurality of bit lines BL may be disposed, and a plurality of memory cells (MC) may be arranged.

The plurality of memory blocks BLK1 to BLKz may be coupled with the address decoder 220 through the plurality of word lines WL. The plurality of memory blocks BLK1 to BLKz may be coupled with the read and write circuit 230 through the plurality of bit lines BL.

Each of the plurality of memory blocks BLK1 to BLKz may include a plurality of memory cells. For example, the plurality of memory cells may be nonvolatile memory cells, and may be configured by nonvolatile memory cells that have vertical channel structures.

The memory cell array 210 may be configured by a memory cell array of a two-dimensional structure or may be configured by a memory cell array of a three-dimensional structure.

Each of the plurality of memory cells included in the memory cell array 210 may store at least 1-bit data. For instance, each of the plurality of memory cells included in the memory cell array 210 may be a single level cell (SLC) capable of storing 1-bit data. In another instance, each of the plurality of memory cells included in the memory cell array 210 may be a multi-level cell (MLC) capable of storing 2-bit data. In still another instance, each of the plurality of memory cells included in the memory cell array 210 may be a triple level cell (TLC) capable of storing 3-bit data. In yet another instance, each of the plurality of memory cells included in the memory cell array 210 may be a quad level cell (QLC) capable of storing 4-bit data. In a further instance, the memory cell array 210 may include a plurality of memory cells, each of which is capable of storing 5 or more-bit data.

The number of bits of data stored in each of the plurality of memory cells may be dynamically determined. For example, a single-level cell that stores 1-bit data may be changed to a triple-level cell that stores 3-bit data.

Referring to FIG. 2, the address decoder 220, the read and write circuit 230, the control logic 240 and the voltage generation circuit 250 may operate as a peripheral circuit that drives the memory cell array 210.

The address decoder 220 may be coupled to the memory cell array 210 through the plurality of word lines WL.

The address decoder 220 may operate under the control of the control logic 240.

The address decoder 220 may receive an address through an input/output buffer in the memory 110. The address decoder 220 may decode a block address in the received address. The address decoder 220 may select at least one memory block depending on the decoded block address.

The address decoder 220 may receive a read voltage Vread and a pass voltage Vpass from the voltage generation circuit 250.

The address decoder 220 may apply the read voltage Vread to a selected word line WL in a selected memory block during a read operation, and may apply the pass voltage Vpass to the remaining unselected word lines WL.

The address decoder 220 may apply a verify voltage generated in the voltage generation circuit 250 to a selected word line WL in a selected memory block in a program verify operation, and may apply the pass voltage Vpass to the remaining unselected word lines WL.

The address decoder 220 may decode a column address in the received address. The address decoder 220 may transmit the decoded column address to the read and write circuit 230.

A read operation and a program operation of the memory 110 may be performed by the unit of a page. An address received when a read operation or a program operation is requested may include at least one of a block address, a row address and a column address.

The address decoder 220 may select one memory block and one word line depending on a block address and a row address. A column address may be decoded by the address decoder 220 and be provided to the read and write circuit 230.

The address decoder 220 may include at least one of a block decoder, a row decoder, a column decoder and an address buffer.

The read and write circuit 230 may include a plurality of page buffers PB. The read and write circuit 230 may operate as a read circuit in a read operation of the memory cell array 210, and may operate as a write circuit in a write operation of the memory cell array 210.

The read and write circuit 230 described above may also be referred to as a page buffer circuit or a data register circuit that includes a plurality of page buffers PB. The read and write circuit 230 may include data buffers that take charge of a data processing function, and may further include cache buffers that take charge of a caching function.

The plurality of page buffers PB may be coupled to the memory cell array 210 through the plurality of bit lines BL. The plurality of page buffers PB may continuously supply sensing current to bit lines BL coupled with memory cells to sense threshold voltages (Vth) of the memory cells in a read operation and a program verify operation, and may latch sensing data by sensing, through sensing nodes, changes in the amounts of current flowing, depending on the programmed states of the corresponding memory cells.

The read and write circuit 230 may operate in response to page buffer control signals outputted from the control logic 240.

In a read operation, the read and write circuit 230 temporarily stores read data by sensing data of memory cells, and then, outputs data DATA to the input/output buffer of the memory 110. In an embodiment, the read and write circuit 230 may include a column select circuit in addition to the page buffers PB or the page registers.

The control logic 240 may be coupled with the address decoder 220, the read and write circuit 230 and the voltage generation circuit 250. The control logic 240 may receive a command CMD and a control signal CTRL through the input/output buffer of the memory 110.

The control logic 240 may control general operations of the memory 110 in response to the control signal CTRL. The control logic 240 may output control signals for adjusting the precharge potential levels of the sensing nodes of the plurality of page buffers PB.

The control logic 240 may control the read and write circuit 230 to perform a read operation of the memory cell array 210. The voltage generation circuit 250 may generate the read voltage Vread and the pass voltage Vpass used in a read operation, in response to a voltage generation circuit control signal outputted from the control logic 240.

Each memory block of the memory 110 described above may be configured by a plurality of pages corresponding to a plurality of word lines WL and a plurality of strings corresponding to a plurality of bit lines BL.

In a memory block BLK, a plurality of word lines WL and a plurality of bit lines BL may be disposed to intersect with each other. For example, each of the plurality of word lines WL may be disposed in a row direction, and each of the plurality of bit lines BL may be disposed in a column direction. In another example, each of the plurality of word lines WL may be disposed in a column direction, and each of the plurality of bit lines BL may be disposed in a row direction.

A memory cell may be coupled to one of the plurality of word lines WL and one of the plurality of bit lines BL. A transistor may be disposed in each memory cell.

For example, a transistor disposed in each memory cell (MC) may include a drain, a source and a gate. The drain (or source) of the transistor may be coupled with a corresponding bit line BL directly or via another transistor. The source (or drain) of the transistor may be coupled with a source line (which may be the ground) directly or via another transistor. The gate of the transistor may include a floating gate which is surrounded by a dielectric, and a control gate to which a gate voltage is applied from a word line WL.

In each memory block, a first select line (also referred to as a source select line or a drain select line) may be additionally disposed outside a first outermost word line more adjacent to the read and write circuit 230 between two outermost word lines, and a second select line (also referred to as a drain select line or a source select line) may be additionally disposed outside a second outermost word line between the two outermost word lines.

At least one dummy word line may be additionally disposed between the first outermost word line and the first select line. At least one dummy word line may also be additionally disposed between the second outermost word line and the second select line.

A read operation and a program operation (write operation) of the memory block described above may be performed by the unit of a page, and an erase operation may be performed by the unit of a memory block.

Figure 3:
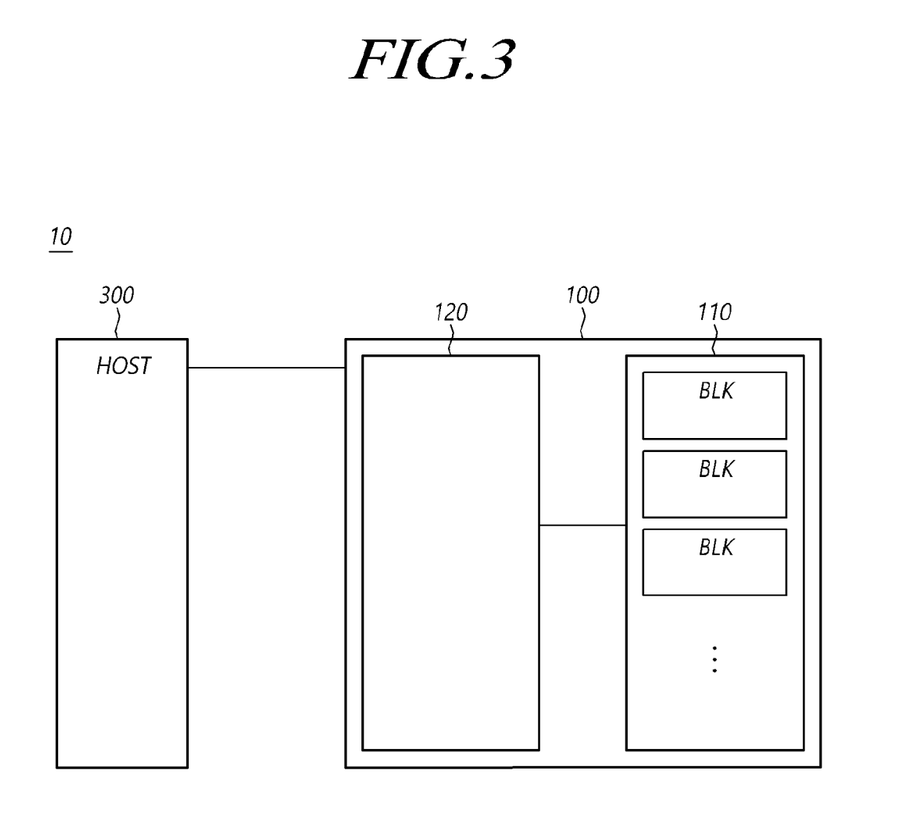
FIG. 3 illustrates a schematic structure of a system according to embodiments of the present disclosure.

FIG. 3 illustrates a schematic structure of a system 10 according to embodiments of the present disclosure.

Referring to FIG. 3, the system 10 may include the storage device 100 and a host 300.

The storage device 100 may include the memory 110 and the controller 120.

The memory 110 may include a plurality of memory blocks BLK. Data may be written to each of the plurality of memory blocks BLK.

The controller 120 may control the memory 110. The controller 120 may load firmware stored in the memory 110 and run the firmware in order to control the memory 110.

The host 300 may write data to the storage device 100 and read data from the storage device 100. Further, the host 300 may transmit a command requesting that instructing the storage device 100 to execute a specific operation, to the storage device 100.

For example, the host 300 may transmit a command requesting instructing the storage device 100 to execute an error check on a memory block in which firmware is stored to the storage device 100. Hereinafter, this will be described in detail in FIG. 4.

Figure 4:
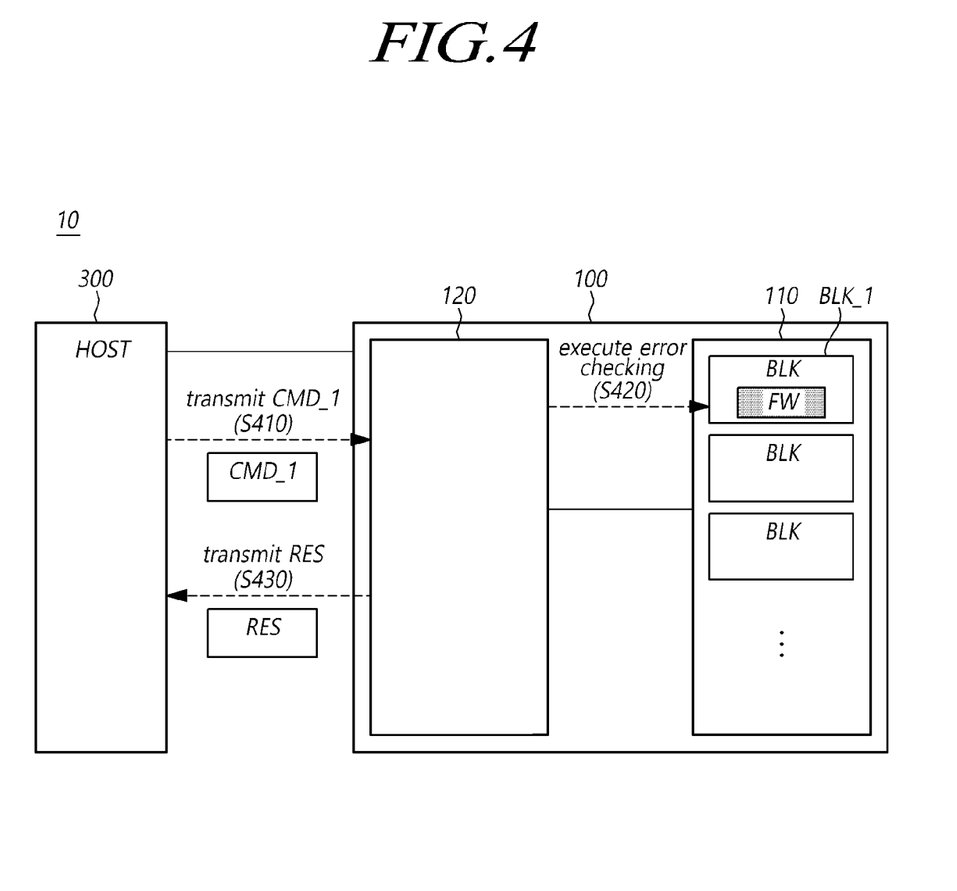
FIG. 4 illustrates an operation in which a storage device executes an error check according to embodiments of the present disclosure.

FIG. 4 illustrates an operation in which the storage device 100 executes an error check according to embodiments of the present disclosure.

Referring to FIG. 4, the host 300 may transmit a first command CMD requesting instructing the storage device 100 to execute an error check on a first memory block BLK_1 among the plurality of memory blocks BLK, to the storage device 100 (S410).

The error check on the first memory block BLK_1 may be performed by reading data stored in the first memory block BLK_1 and determining whether UECC (Uncorrectable ECC) exists in the read data.

The first memory block BLK_1 may be a memory block in which default firmware FW loaded when a booting operation is executed is stored. The memory 110 may store a plurality of firmwares, and may load the default firmware FW among the plurality of firmwares when a booting operation is executed.

When executing the booting operation, the controller 120 of the storage device 100 may load the default firmware FW stored in the first memory block BLK_1 and run the loaded default firmware FW. When the controller 120 loads the default firmware FW, the controller 120 may make the default firmware FW ready to run by copying all or part of the default firmware FW to the working memory 125 of FIG. 1.

Meanwhile, the first memory block BLK_1 may additionally store backup firmware for the default firmware FW as well as the default firmware FW. The backup firmware may be a copy of the default firmware FW, and the controller 120 may use the backup firmware instead of the default firmware FW when it is determined that an error (i.e., UECC) exists in the default firmware FW.

The host 300 may transmit the first command CMD_1 to the storage device 100 when it is determined that an error check on the first memory block BLK_1 is needed.

For example, the host 300 may transmit the first command CMD_1 to the storage device 100 when the host 300 instructs the controller 120 of the storage device 100 to update the default firmware FW.

That is, the host 300 may instruct, before updating the default firmware FW, the storage device 100 to execute an error check on the first memory block BLK_1 in which the default firmware FW is stored. The host 300 may determine the reliability and stability of the first memory block BLK_1 for storing the firmware to be updated. Meanwhile, the first command CMD_1 may be transmitted to the storage device 100 separately from a command requesting instructing the storage device 100 to update the default firmware FW.

The controller 120 may execute an error check on the first memory block BLK_1 when receiving the first command CMD_1 from the host 300 (S420).

The controller 120 may transmit result information RES for the error check to the host 300 (S430). The host 300 may receive the result information RES, and determine reliability of the first memory block BLK_1 based on the result information RES.

Figure 5:
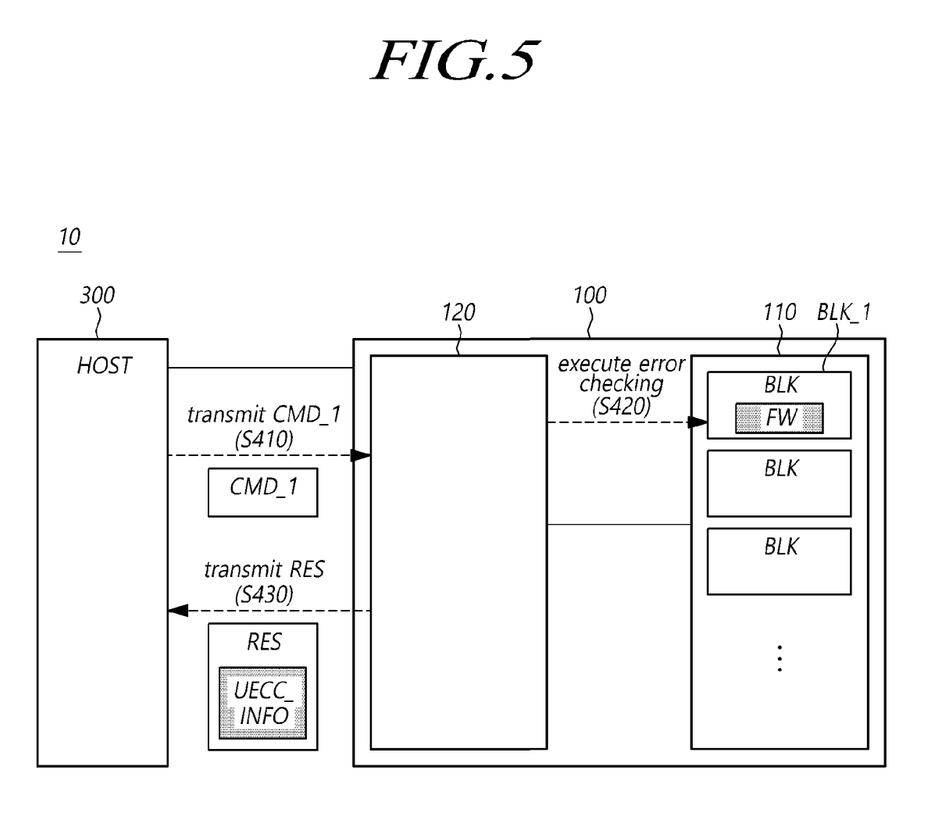
FIG. 5 illustrates an example of UECC generation information transmitted by a storage device to a host according to embodiments of the present disclosure.

FIG. 5 illustrates an example of UECC generation information transmitted by a storage device to a host according to embodiments of the present disclosure.

As described above with reference to FIG. 4, the host 300 may transmit the first command CMD_1 to the controller 120 (S410), the controller 120 may execute an error check on the first memory block BLK_1 (S420), and the controller 120 may transmit the result information RES for the error check to the host 300 (S430).

In this case, the result information RES for the error check may include UECC generation information UECC_INFO for data read from the first memory block BLK_1.

When the controller 120 executes an error check on the first memory block BLK_1, the controller 120 may read data from the first memory block BLK_1 and determine whether UECC exists in the data read from the first memory block BLK_1.

For example, the data read from the first memory block BLK_1 may include the aforementioned default firmware FW.

As another example, the data read from the first memory block BLK_1 may further include backup firmware for the default firmware FW.

As another example, the data read from the first memory block BLK_1 may be data stored in a first page among a plurality of pages included in the first memory block BLK_1.

The storage device 100 may rewrite the default firmware FW into the first memory block BLK_1 according to whether UECC exists in the data read from the first memory block BLK_1. Hereinafter, this will be described in detail in FIGS. 6 and 7.

Figure 6:
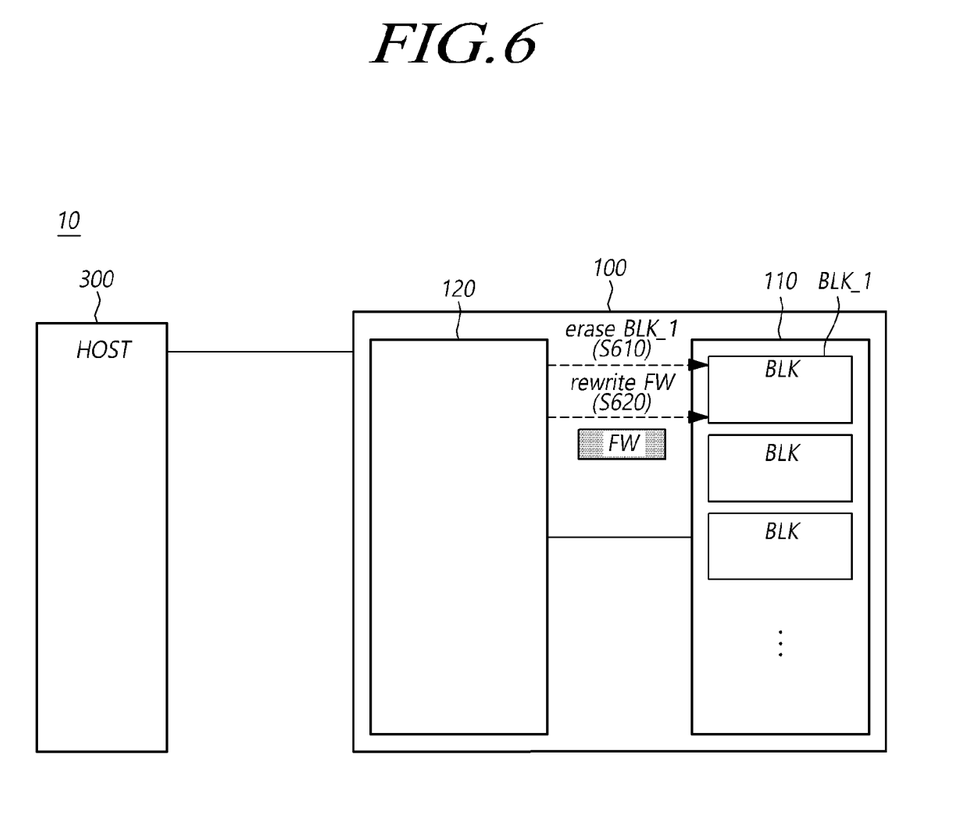
FIG. 6 illustrates an example of an operation in which a storage device rewrites a default firmware according to embodiments of the present disclosure.

FIG. 6 illustrates an example of an operation in which a storage device rewrites a default firmware according to embodiments of the present disclosure.

Referring to FIG. 6, when it is determined that UECC exists in data read from the first memory block BLK_1, the controller 120 of the storage device 100 may erase the first memory block BLK_1 (S610), and rewrite the default firmware FW into the first memory block BLK_1 (S620). That is, the controller 120 itself may rewrite the default firmware FW.

For example, in order to rewrite the default firmware FW into the first memory block BLK_1, the controller 120 may read backup firmware for the default firmware FW from the memory blocks other than the first memory block BLK_1 among the plurality of memory blocks BLK.

As another example, in order to rewrite the default firmware FW into the first memory block BLK_1, the controller 120 may execute an error correction operation on the default firmware after reading the default firmware FW from the first memory block BLK_1.

Figure 7:
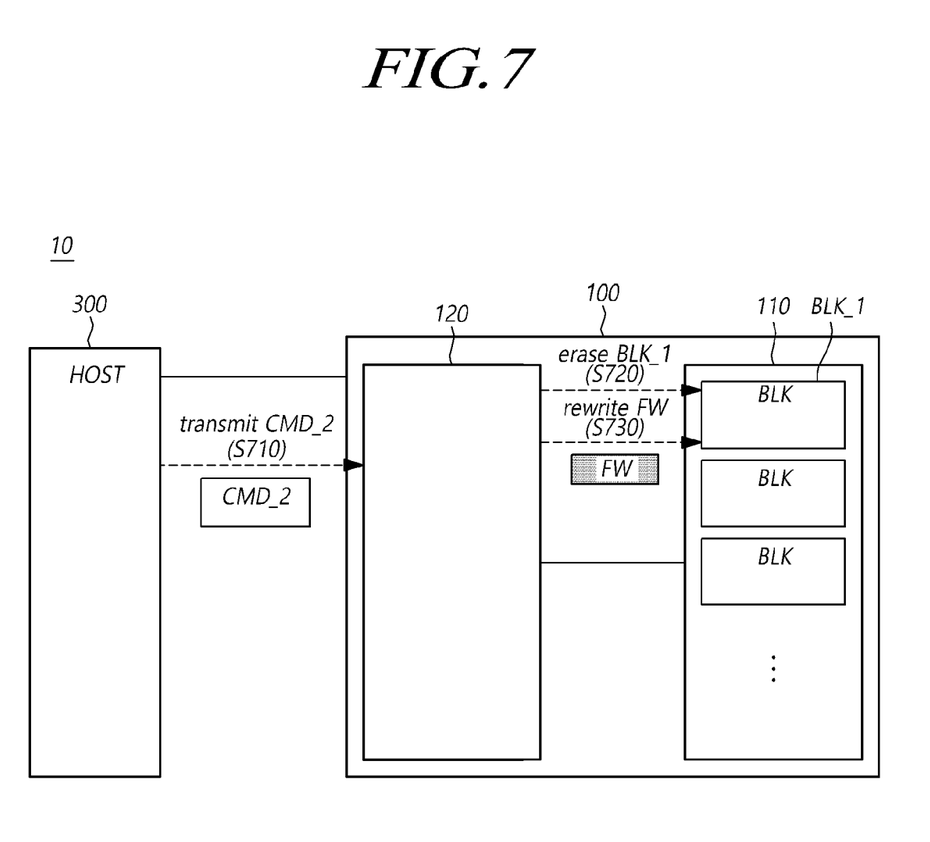
FIG. 7 illustrates another example of an operation in which a storage device rewrites a default firmware according to embodiments of the present disclosure.

FIG. 7 illustrates another example of an operation in which a storage device rewrites a default firmware according to embodiments of the present disclosure.

Referring to FIG. 7, the host 300 may transmit a second command CMD_2 requesting instructing the storage device 100 to rewrite the default firmware FW into the first memory block BLK_1, to the controller 120 of the storage device 100 (S710). For example, the host 300 may determine whether to request the storage device 100 to rewrite the default firmware FW in the first memory block BLK_1 based on the UECC generation information UECC_INFO described in FIG. 5.

When the controller 120 receives the second command CMD_2 from the host 300, the controller 120 may erase the first memory block BLK_1 (S720) and rewrite the default firmware FW into the first memory block BLK_1 (S730). That is, the controller 120 may rewrite the default firmware FW according to the request from the host 300.

Meanwhile, the host 300 may request the storage device 100 to replace the memory block in which the default firmware FW is stored as well as to rewrite the default firmware FW.

For example, when the host 300 determines that there is a concern with reliability and stability of the first memory block BLK_1 in which the default firmware FW is stored, the host 300 may request the storage device 100 to replace the memory block in which the default firmware FW is stored in order to prevent an error while running the default firmware FW. This will be described in detail in FIG. 8.

Figure 8:
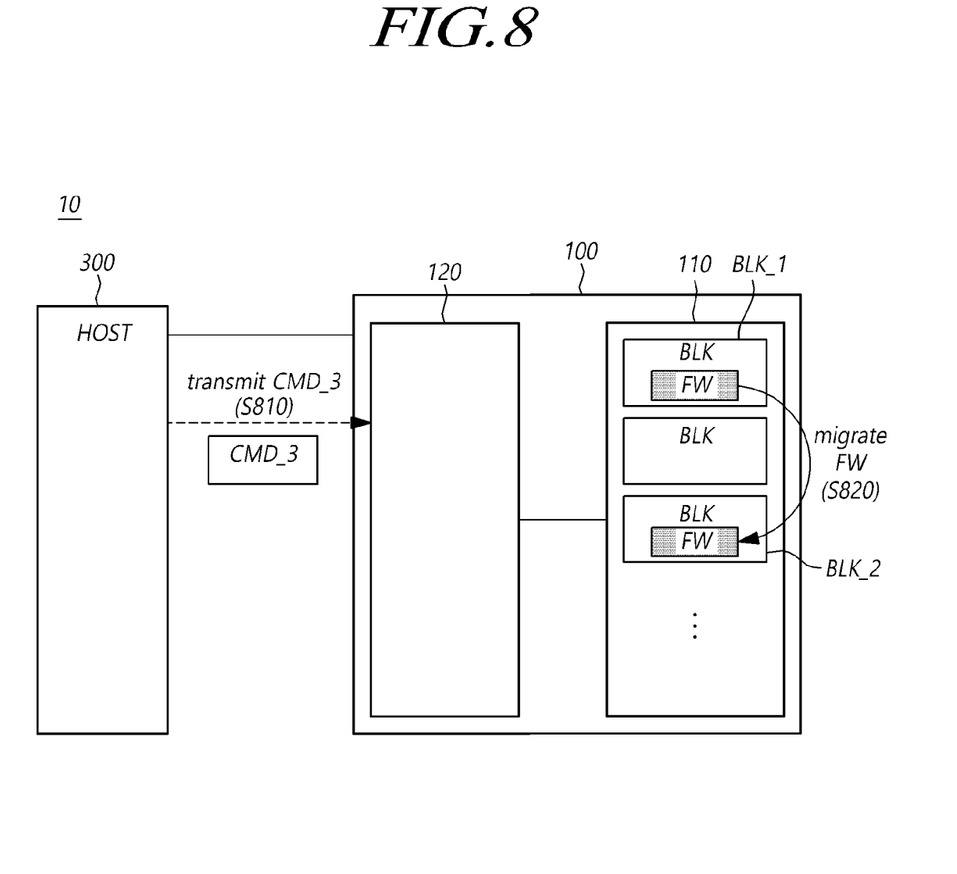
FIG. 8 illustrates an operation in which a storage device migrates a default firmware according to embodiments of the present disclosure.

FIG. 8 illustrates an operation in which a storage device migrates a default firmware according to embodiments of the present disclosure.

Referring to FIG. 8, the host 300 may transmit a third command CMD_3 requesting instructing the storage device 100 to execute replacement of a memory block in which the default firmware FW is stored, to the controller 120 of the storage device 100 (S810).

When the controller 120 receives the third command CMD_3 from the host 300, the controller 120 may migrate the default firmware FW stored in the first memory block BLK_1 to a second memory block BLK_2 among the plurality of memory blocks (S820).

After the default firmware FW is migrated to the second memory block BLK_2, the controller 120 may load the default firmware FW from the second memory block BLK_2 instead of the first memory block BLK_1 during a subsequent booting operation. In this case, the first memory block BLK_1 may be erased and/or set as a bad memory block.

In the above, an operation in which the host 300 requests the storage device 100 to rewrite the default firmware FW or to replace a memory block in which the default firmware FW is stored has been described.

In order to determine whether to rewrite the default firmware FW or replace the memory block in which the default firmware FW is stored, the host 300 may request information about the first memory block BLK_1 in which the default firmware FW is stored from the storage device 100. This will be described in detail in FIG. 9.

Figure 9:
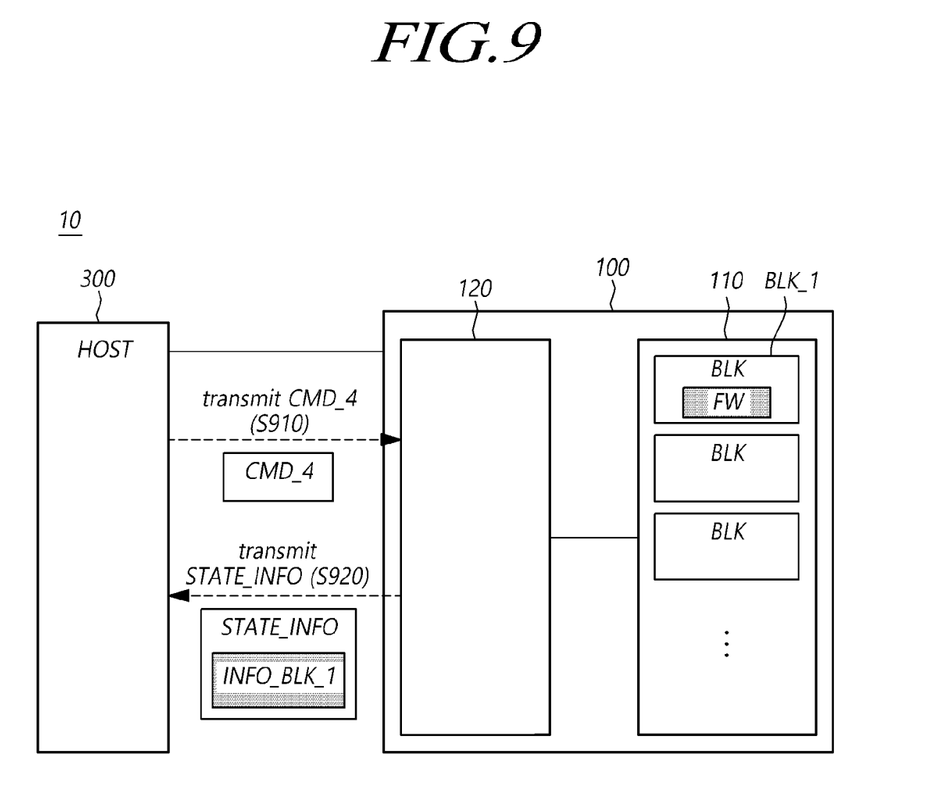
FIG. 9 illustrates an example of state information transmitted by the storage device to the host according to embodiments of the present disclosure.

FIG. 9 illustrates an example of state information transmitted by the storage device to the host according to embodiments of the present disclosure.

Referring to FIG. 9, the host 300 may transmit a fourth command CMD_4 requesting state information STATE_INFO of the storage device 100 to the controller 120 of the storage device 100 (S910).

The controller 120 may transmit the state information STATE_INFO to the host 300 when receiving the fourth command CMD_4.

For example, the state information STATE_INFO may include initial bad block information and runtime bad block information for the plurality of memory blocks BLK included in the memory 110, the size of data requested by the host 300 to be written, size of data internally written by the storage device 100 and lifespan information of the storage device 100.

The controller 120 may add information of the first memory block BLK_1 to the state information STATE_INFO.

For example, the information on the first memory block BLK_1 added to the state information STATE_INFO may include a physical address of the first memory block BLK_1.

As another example, the information on the first memory block BLK_1 added to the state information STATE_INFO may include an index corresponding to the physical address of the first memory block BLK_1. In this case, the controller 120 may manage physical addresses of the plurality of memory blocks BLK and indexes mapped to the physical addresses respectively.

Figure 10:
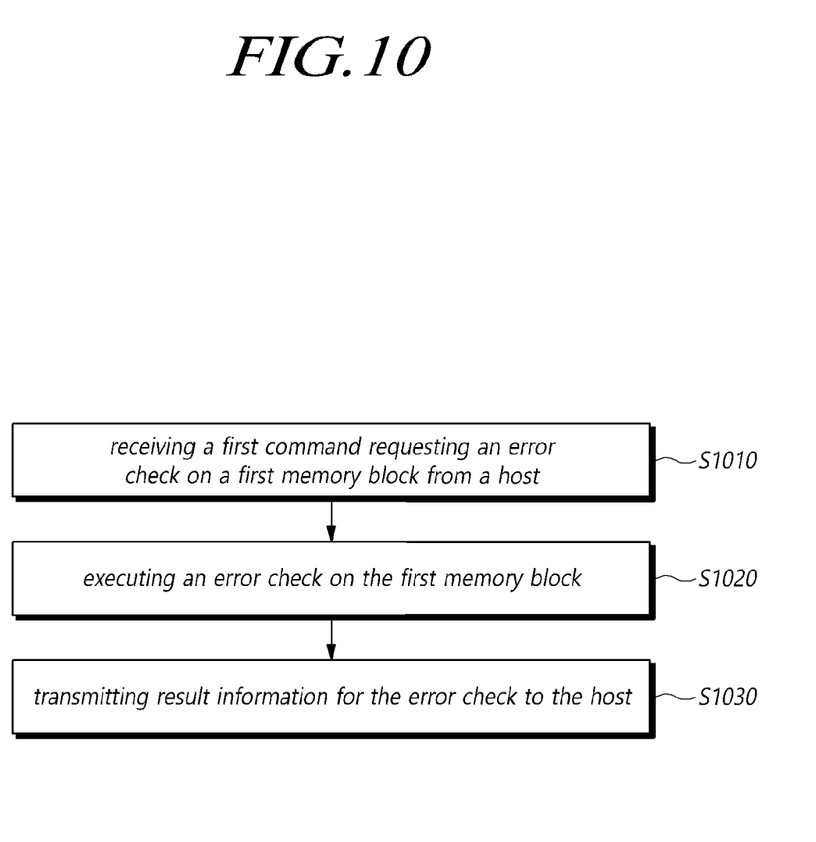
FIG. 10 illustrates an operating method of a storage device according to embodiments of the present disclosure.

FIG. 10 illustrates an operating method of a storage device according to embodiments of the present disclosure.

First, the operating method of the storage device 100 may include receiving the first command CMD_1 requesting instructing the storage device 100 to execute an error check on the first memory block BLK_1 among the plurality of memory blocks BLK from the host 300 (S1010).

The first memory block BLK_1 may be a memory block in which the default firmware FW loaded when a booting operation is executed is stored.

For example, the operation S1010 may receive the first command CMD_1 from the host 300 when the host 300 requests the storage device 100 to update the default firmware FW.

Further, the operating method of the storage device 100 may include executing an error check on the first memory block BLK_1 (S1020).

Further, the operating method of the storage device 100 may include transmitting the result information RES for the error check to the host 300 (S1030).

The result information REST for the error check may include UECC generation information for data read from the first memory block BLK_1.

For example, the operating method of the storage device 100 may further include i) determining whether UECC exists in data read from the first memory block BLK_1; and ii) erasing the first memory block BLK_1 and rewriting the default firmware FW into the first memory block BLK_1 when it is determined that UECC exists in the data read from the first memory block BLK_1.

As another example, the operating method of the storage device 100 may further include i) receiving, from the host 300, the second command CMD_2 requesting instructing the storage device 100 to rewrite the default firmware FW into the first memory block BLK_1; and ii) erasing the first memory block BLK_1 and rewriting the default firmware FW into the first memory block BLK_1.

The operating method of the storage device 100 may further include i) receiving, from the host 300, the third command CMD_3 requesting instructing the storage device 100 to execute replacement of a memory block in which the default firmware FW is stored; and ii) migrating the default firmware FW to the second memory block BLK_2 among the plurality of memory blocks BLK_2.

Although embodiments of the present disclosure have been described for illustrative purposes, those skilled in the art will appreciate that various modifications, additions and substitutions are possible, without departing from the scope and spirit of the disclosure. Therefore, the embodiments disclosed above and in the accompanying drawings should be considered in a descriptive sense only and not for limiting the technological scope. The technological scope of the disclosure is not limited by the embodiments and the accompanying drawings. The spirit and scope of the disclosure should be interpreted in connection with the appended claims and encompass all equivalents falling within the scope of the appended claims. Furthermore, the embodiments may be combined to form additional embodiments.

What is claimed is:

1. A storage device comprising:
a memory including a plurality of memory blocks; and
a controller configured to:
receive, from a host, a first command instructing the storage device to execute an error check on a first memory block among the plurality of memory blocks, and
transmit result information for the error check to the host,
wherein the first memory block is configured to store default firmware to be loaded when a booting operation is executed,
wherein the host transmits to the controller the first command for executing the error check on the first memory block upon the host instructing the controller to update the default firmware,
wherein the controller executes the error check on the first memory block, before updating the default firmware, to determine suitability of the first memory block for storing the default firmware,
wherein the storage device further stores backup firmware for the default firmware, and
wherein the controller determines if an error exists in the default firmware and, upon existence of the error, reads the backup firmware.

2. The storage device according to claim 1, wherein the controller is configured to receive the first command from the host when the host instructs the controller to update the default firmware.

3. The storage device according to claim 1, wherein the result information includes UECC (Uncorrectable ECC) generation information for data read from the first memory block.

4. The storage device according to claim 3, wherein the controller is configured to erase the first memory block and rewrite the default firmware into the first memory block when the UECC exists in data read from the first memory block.

5. The storage device according to claim 3, wherein the controller is configured to erase the first memory block and rewrite the default firmware into the first memory block when receiving, from the host, a second command instructing the storage device to rewrite the default firmware into the first memory block.

6. The storage device according to claim 1, wherein the controller is configured to migrate the default firmware to a second memory block among the plurality of memory blocks when receiving, from the host, a third command instructing the storage device to execute replacement of a memory block in which the default firmware is stored.

7. The storage device according to claim 1,
wherein the controller is configured to transmit state information including information of the first memory block to the host when receiving, from the host, a fourth command instructing the state information of the storage device.

8. The storage device according to claim 7,
wherein the information of the first memory block includes a physical address of the first memory block or an index corresponding to the physical address of the first memory block.

9. An operating method of a storage device, the operating method comprising:
receiving, from a host, a first command instructing the storage device to execute an error check on a first memory block among a plurality of memory blocks included in the storage device;
executing the error check on the first memory block; and
transmitting result information for the error check to the host;
wherein the first memory block is configured to store default firmware to be loaded when a booting operation is executed,
wherein the host transmits to a controller the first command for executing the error check on the first memory block upon the host instructing the controller to update the default firmware,
wherein the controller executes the error check on the first memory block, before updating the default firmware, to determine suitability of the first memory block for storing the default firmware,
wherein the storage device further stores backup firmware for the default firmware, and
wherein the controller determines if an error exists in the default firmware and, upon existence of the error, reads the backup firmware.

10. The operating method according to claim 9,
wherein the receiving the first command from the host comprises receiving the first command from the host when the host instructs the storage device to update the default firmware.

11. The operating method according to claim 9,
wherein the result information includes UECC (Uncorrectable ECC) generation information for data read from the first memory block.

12. The operating method according to claim 11, further comprising:
determining whether UECC exists in data read from the first memory block;
erasing the first memory block; and
rewriting the default firmware into the first memory block when the UECC exists in the data read from the first memory block.

13. The operating method according to claim 11, further comprising:
receiving, from the host, a second command instructing the storage device to rewrite the default firmware into the first memory block;
erasing the first memory block; and
rewriting the default firmware into the first memory block.

14. The operating method according to claim 9, further comprising:
receiving, from the host, a third command instructing the storage device to execute replacement of a memory block in which the default firmware is stored; and
migrating the default firmware to a second memory block among the plurality of memory blocks.

15. The operating method according to claim 9, further comprising:
receiving, from the host, a fourth command instructing state information of the storage device; and
transmitting state information including information of the first memory block to the host.

16. A system comprising:
a host; and
a storage device including a plurality of memory blocks,
wherein the storage device is configured to:
receive, from the host, a first request instructing the storage device to execute an error check on a first memory block among the plurality of memory blocks;
execute the error check on the first memory block; and
transmit result information for the error check to the host, and
wherein the first memory block is configured to store default firmware to be loaded when the storage device executes a booting operation,
wherein the host transmits to a controller the first request for executing the error check on the first memory block upon the host instructing the controller to update the default firmware, and
wherein the controller executes the error check on the first memory block, before updating the default firmware, to determine suitability of the first memory block for storing the default firmware,
wherein the storage device further stores backup firmware for the default firmware, and
wherein the controller determines if an error exists in the default firmware and, upon existence of the error, reads the backup firmware.

17. The system according to claim 16,
wherein the storage device is configured to receive the first request from the host when the host instructs the storage device to update the default firmware.

* * * * *